(12) United States Patent
Campbell et al.

(10) Patent No.: US 10,536,615 B2
(45) Date of Patent: Jan. 14, 2020

(54) UNDERWATER HOUSING WITH OFFSET DOMES FOR DUAL LENS SPHERICAL CAMERA

(71) Applicant: GoPro, Inc., San Mateo, CA (US)

(72) Inventors: Scott Patrick Campbell, Belmont, CA (US); Timothy Macmillan, La Honda, CA (US); Andrew Ganzon, Belmont, CA (US)

(73) Assignee: GoPro, Inc., San Mateo, CA (US)

( * ) Notice: Subject to any disclaimer, the term of this patent is extended or adjusted under 35 U.S.C. 154(b) by 84 days.

(21) Appl. No.: 15/430,692

(22) Filed: Feb. 13, 2017

(65) Prior Publication Data

US 2018/0146122 A1 May 24, 2018

Related U.S. Application Data

(60) Provisional application No. 62/426,084, filed on Nov. 23, 2016.

(51) Int. Cl.
*H04N 5/225* (2006.01)
*G03B 17/08* (2006.01)
*G03B 17/56* (2006.01)

(52) U.S. Cl.
CPC .......... *H04N 5/2252* (2013.01); *G03B 17/08* (2013.01); *G03B 17/561* (2013.01); *H04N 5/2253* (2013.01); *H04N 5/2254* (2013.01); *H04N 5/2258* (2013.01)

(58) Field of Classification Search
CPC ..... H04N 5/2252; H04N 5/2258; G03B 17/08
See application file for complete search history.

(56) References Cited

U.S. PATENT DOCUMENTS

| 8,902,318 | B1* | 12/2014 | Haddad | ............... | H04N 5/2353 348/207.1 |
| 2015/0370150 | A1* | 12/2015 | O'Neill | ............... | G03B 17/565 348/360 |
| 2017/0059805 | A1* | 3/2017 | Ranetkins | ............. | G02B 7/004 |
| 2018/0045910 | A1* | 2/2018 | O'Neill | ................... | G02B 7/14 |

OTHER PUBLICATIONS

Knekt, http://www.knektusa.com/video/, Knekt KSD6 6" Dome Port : How to Clean / Replace Dome (product maintenance guide video), video NPL, relevant video at 2:50-3:10; product maintenance guide (Year: 2014/2015).*

* cited by examiner

*Primary Examiner* — Francis Geroleo
*Assistant Examiner* — Christopher Kingsbury Glover
(74) *Attorney, Agent, or Firm* — Young Basile Hanlon & MacFarlane, P.C.

(57) ABSTRACT

An underwater housing comprises a laterally offset back-to-back dome configuration. A dual-lens camera having laterally offset back-to-back lenses is mounted within the housing such that the optical axes of the camera lenses align with the optical axes of the domes. This configuration beneficially minimizes effects introduced by the dome on field of view and focus.

20 Claims, 10 Drawing Sheets

UNDERWATER HOUSING WITH OFFSET DOMES FOR DUAL LENS SPHERICAL CAMERA

RELATED APPLICATIONS

This application claims the benefit of U.S. Provisional Application No. 62/426,084 filed on Nov. 23, 2016, the content of which is incorporated by reference herein.

BACKGROUND

Technical Field

This application relates generally to a camera housing and more specifically to an underwater housing for a dual-lens camera.

Description of the Related Art

Operating a camera underwater may be desirable under a variety of situations. For non-waterproof cameras, a separate waterproof housing may be used to prevent damage to the camera. A challenge with existing underwater housings is that the housing may refract light passing through it, thereby acting like a lens to distort the images captured by the camera when used within the housing. This effect is particularly problematic in multi-lens camera systems in which the distortion may affect different lenses differently, thereby making compensation for these effects more difficult.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

An underwater housing comprises a laterally offset back-to-back dome configuration. A dual-lens camera having laterally offset back-to-back lenses is mounted within the housing such that the optical axes of the camera lenses align with the optical axes of the domes. This configuration beneficially minimizes effects introduced by the dome on field of view and focus.

In a first embodiment, an underwater camera system comprises a dual-lens camera and an underwater housing. The dual-lens camera comprises a camera body, a first image sensor, a second image sensor, a first lens assembly, and a second lens assembly. The camera body comprises at least a first face and a second face opposite the first face. The first image sensor to capture first images corresponding to a first field of view. The second image sensor to capture second images corresponding to a second field of view. The first lens assembly to focus light entering the first lens assembly onto the first image sensor. The second lens assembly to focus light entering the second lens assembly onto the second image sensor. The first lens assembly has a first optical axis laterally offset from a second optical axis of the second lens assembly. The underwater housing comprises a mounting plate, a first dome, and a second dome. The mounting plate comprises a perimeter portion surrounding a cutout. The perimeter portion has a first plurality of attachment points on a first surface of the mounting plate and a second plurality of attachment points on a second surface of the mounting plate opposite the first surface. The perimeter portion furthermore comprises a camera mount for securing the dual-lens camera within the cutout. The first dome is coupled to the first surface of the mounting plate via the first plurality of attachment points. The second dome is coupled to the second surface of the mounting plate via the second plurality of attachment points. The first central axis of the first dome is laterally offset from a second central axis of the second dome.

In another embodiment, an underwater housing for a camera comprises a mounting plate, a first dome, and a second dome. The mounting plate comprises a perimeter portion surrounding a cutout and a camera mount for securing a camera within the cutout. The first dome is coupled to a first surface of the mounting plate. The second dome is coupled to a second surface of the mounting plate opposite the first surface. A first central axis of the first dome is laterally offset from a second central axis of the second dome.

Dual-Lens Camera

Figure 1A:
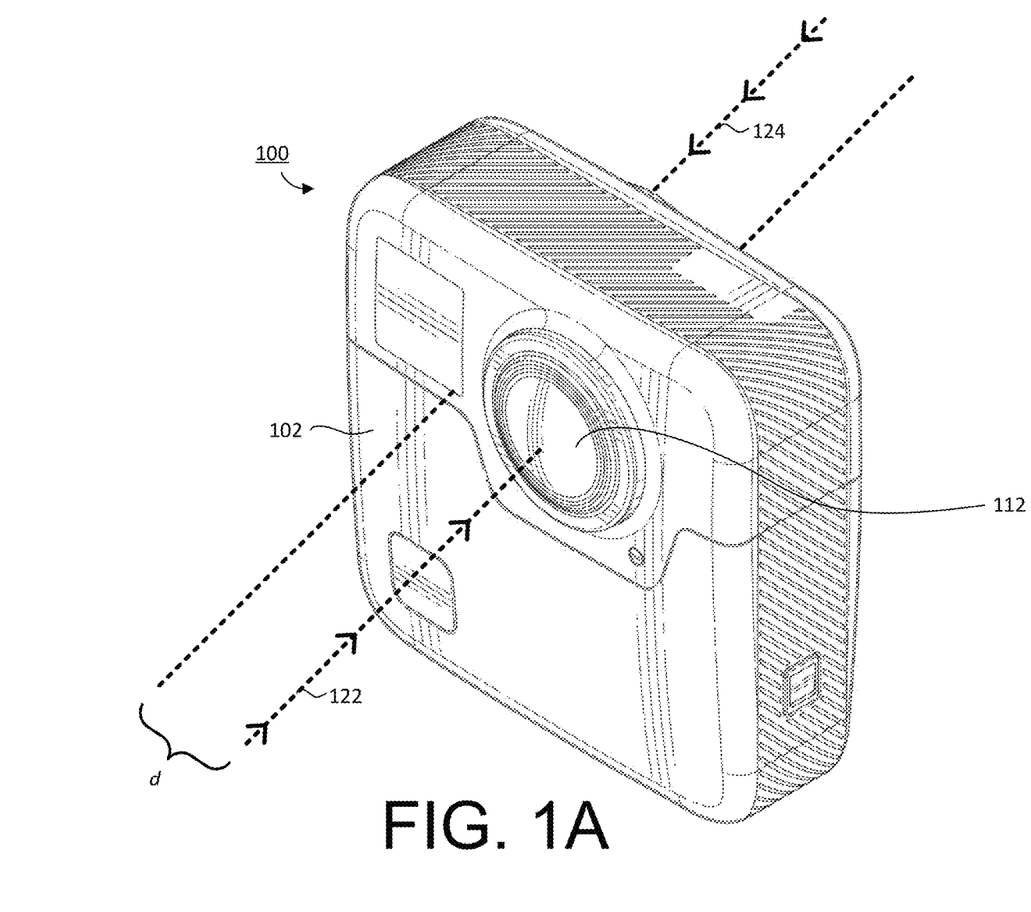
FIG. 1A is a first perspective view of an embodiment of a dual-lens camera.
Figure 1B:
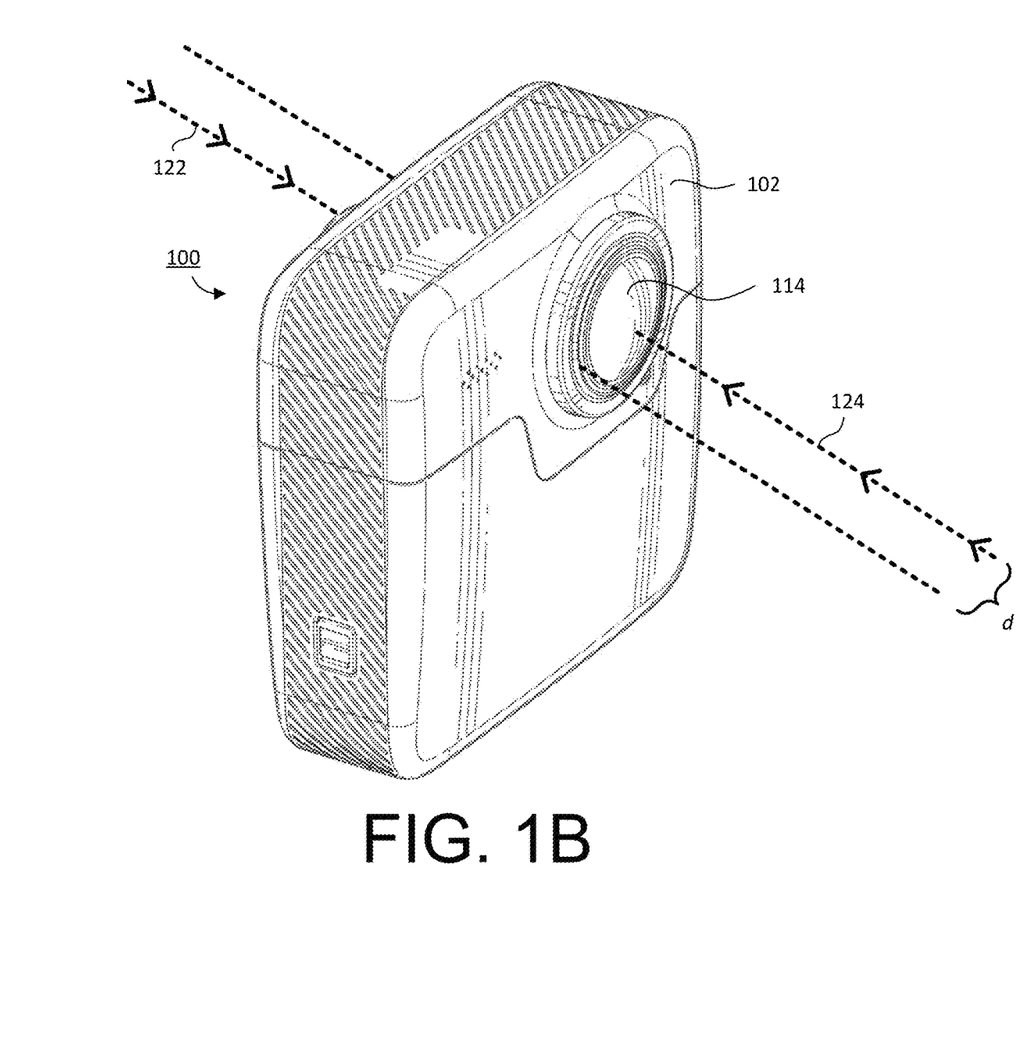
FIG. 1B is a second perspective view of an embodiment of a dual-lens camera.

FIGS. 1A-1B are perspective views illustrating an example embodiment of a dual-lens camera 100. In an embodiment, the camera 100 captures a spherical or near-spherical field of view. For example, in one embodiment, the camera 100 comprises two lens assemblies 112, 114 on opposite faces of the camera body 102. The lens assemblies 112, 114 may each capture a hemispherical or hyper-hemispherical field of view that can be stitched together to generate spherical images. In an embodiment, the lens assemblies 112, 114 are laterally offset from each such that their respective optical axes 122, 124, are separated by a lateral distance d and are anti-parallel to each other (e.g., receive light from opposite directions).

Figure 2:
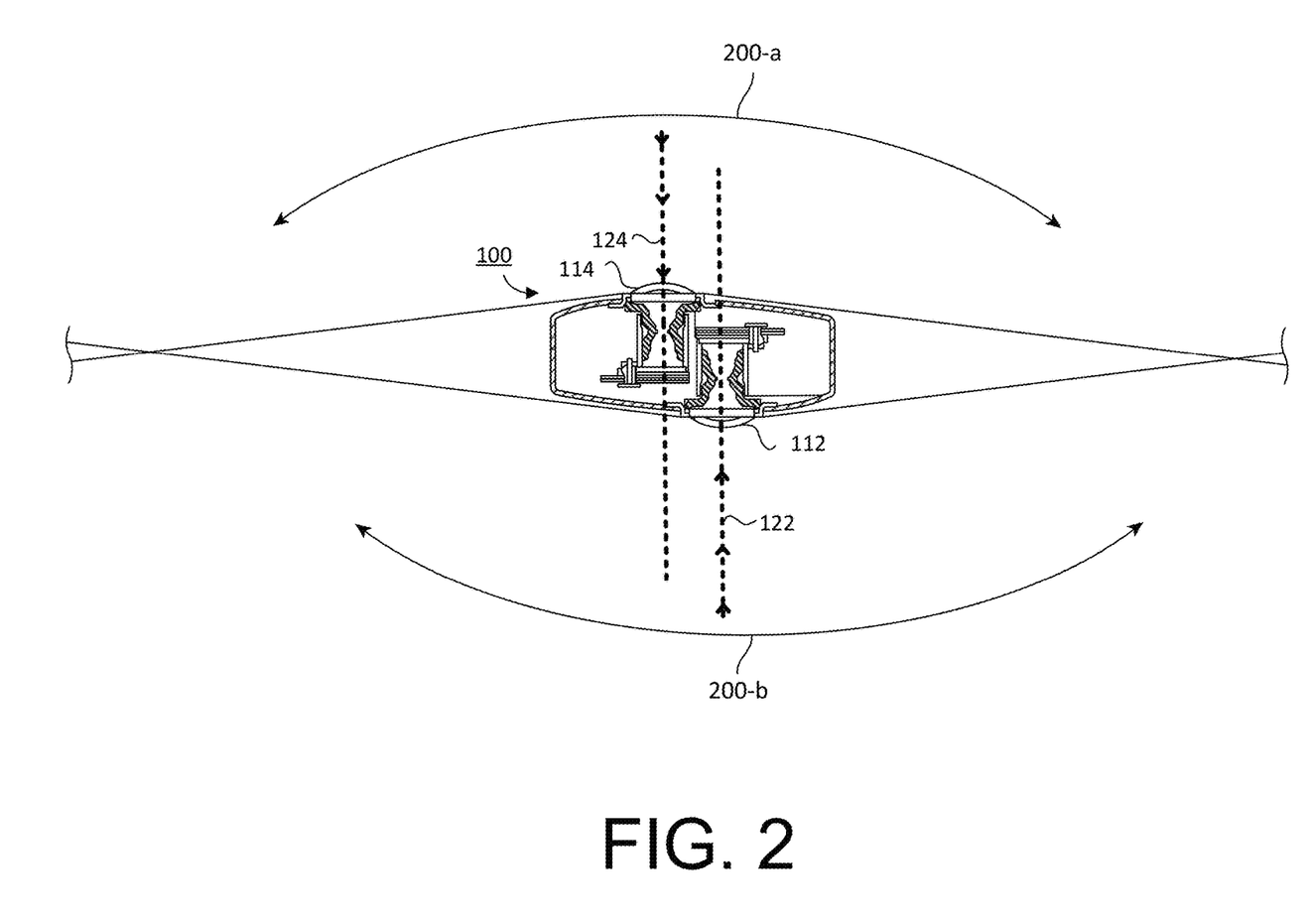
FIG. 2 is a top view of an embodiment of a dual-lens camera.

FIG. 2 is a top cross-sectional view of the camera showing the offset configuration of the lens assemblies 112, 114 and respective optical axes 122, 124. The lens assemblies 112, 114 each have respective hyper-hemispherical fields of view 200-a, 200-b.

Underwater Housing Structure

Figure 3:
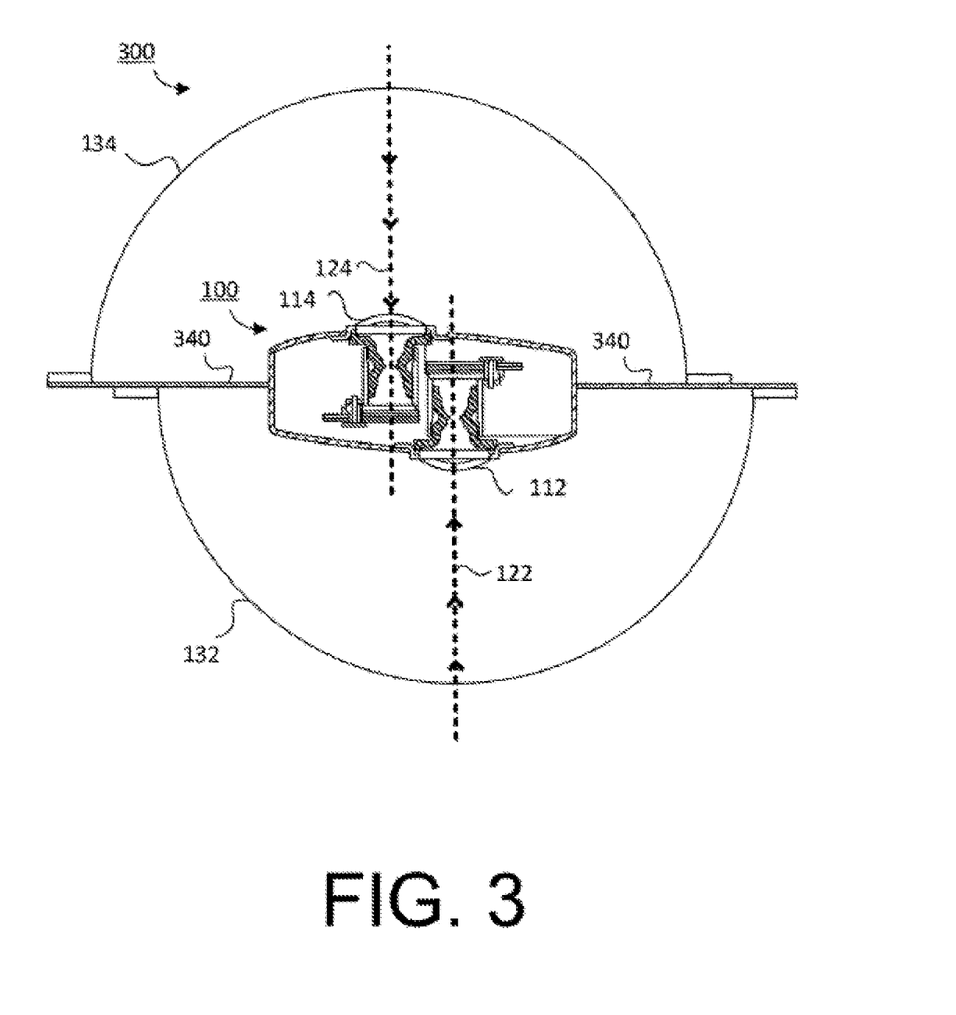
FIG. 3 is a top view of an embodiment of a dual-lens camera in an underwater housing.

FIG. 3 illustrates a top cross-sectional view of an underwater housing 300 for housing a dual-lens camera 100. The housing 300 comprises a center mounting plate 140, a first dome 132, and a second dome 134. The mounting plate 140 may comprise a rigid material (e.g., machined aluminum or hard plastic) and may have a cutout in which the camera 100 may be mounted. The first dome 132 and second dome 134 may each comprise a transparent waterproof material (e.g., plastic) shaped as a hemisphere, quasi-hemisphere (e.g., a raised hemisphere comprising a hemispherical portion and a cylindrical portion or a shortened hemisphere), parabola, or other convex shape. The first dome 132 may comprise a flange portion 142 around an edge of the dome 132 (thus, forming a ring) that extends radially from the dome 132 and may be structured such that a flat surface of the flange portion 142 mates with a first surface of the mounting plate 140. Similarly, the second dome 134 may comprise a flange portion 144 around an edge of the dome 134 (thus forming a ring) that extends radially from the dome 134 and may be structured such that a flat surface of the flange portion 144 mates with a second surface of the mounting plate 140. The flange portions 142, 144 may be fastened to the mounting plate 140 by a fastener such as a screw, nut and bolt, clip, or other fastener. The domes 132, 134 are coupled to the mounting plate 140 such that the domes 132, 134 are laterally offset from each other. For example, in one embodiment, the center of the respective domes 132, 134 are aligned with the respective optical axes 122, 124 of the lens assemblies 112, 114. Thus the domes 132, 134 may be laterally offset from each by a distance d corresponding to the distance between the offset lens assemblies 112, 114.

The offset dome configuration beneficially improves optical performance of the dual-lens camera 100 because the distortion introduced by the domes 132, 134 (which act as a lens) can be minimized when the optical axis of the lens assemblies 112, 114 aligns with the center of the respective domes 132, 134. Furthermore, any distortion introduced by the domes 132, 134 will be approximately equal for each of the lens assemblies 112, 114, thus reducing complexity. Furthermore, even without any compensation, the hemispheres may be stitched together without asymmetric distortion affecting the stitching algorithm.

Figure 4:
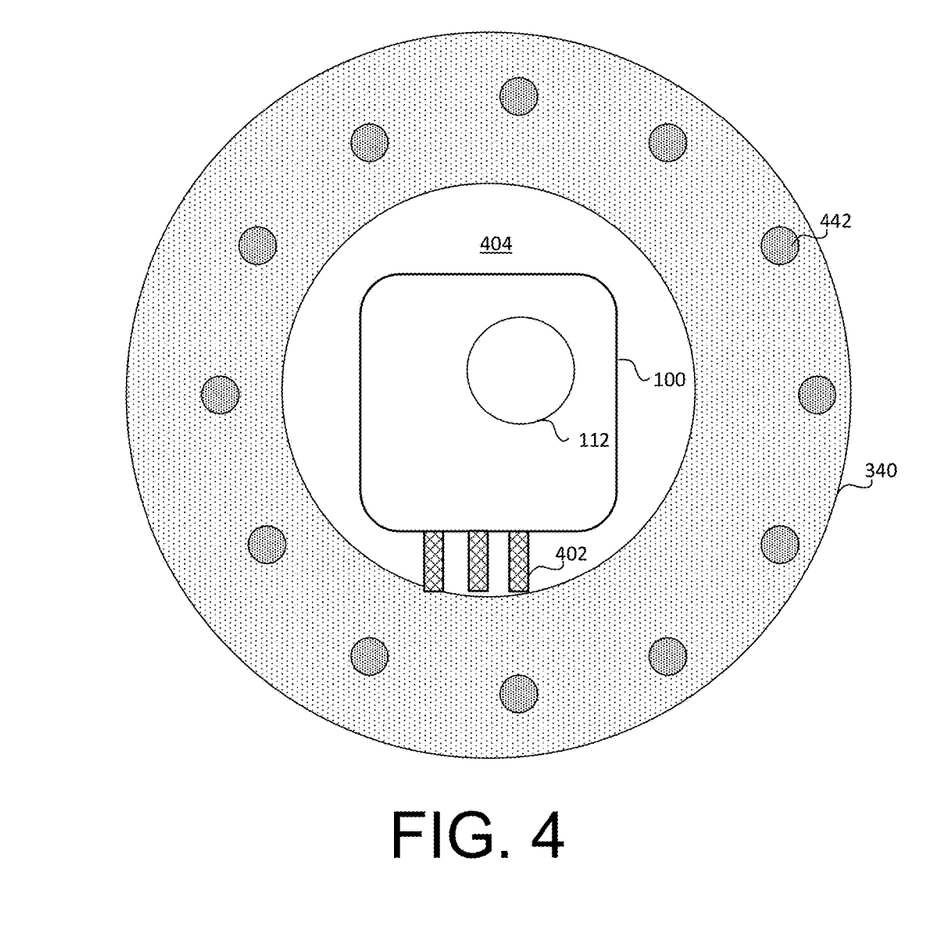
FIG. 4 is a front view of an embodiment of a mounting plate for an underwater housing for a dual-lens camera.

FIG. 4 illustrates a front view of an example embodiment of the mounting plate 340. The mounting plate 340 includes a cutout 404 in which the camera 100 is mounted via a mounting structure 402. In an embodiment, the mounting plate 340 comprises a ring structure. In an embodiment, fastening locations 442 are provided on the mounting plate 340 that enable a dome 132 to be coupled to the mounting plate 340. As illustrated, the fastening locations 442 may be offset from the center (e.g., laterally offset by a distance d) to enable the dome 132 to be mounted in an offset manner such that a center of the dome 132 aligns with the optical axis of the lens assembly 112.

Figure 5:
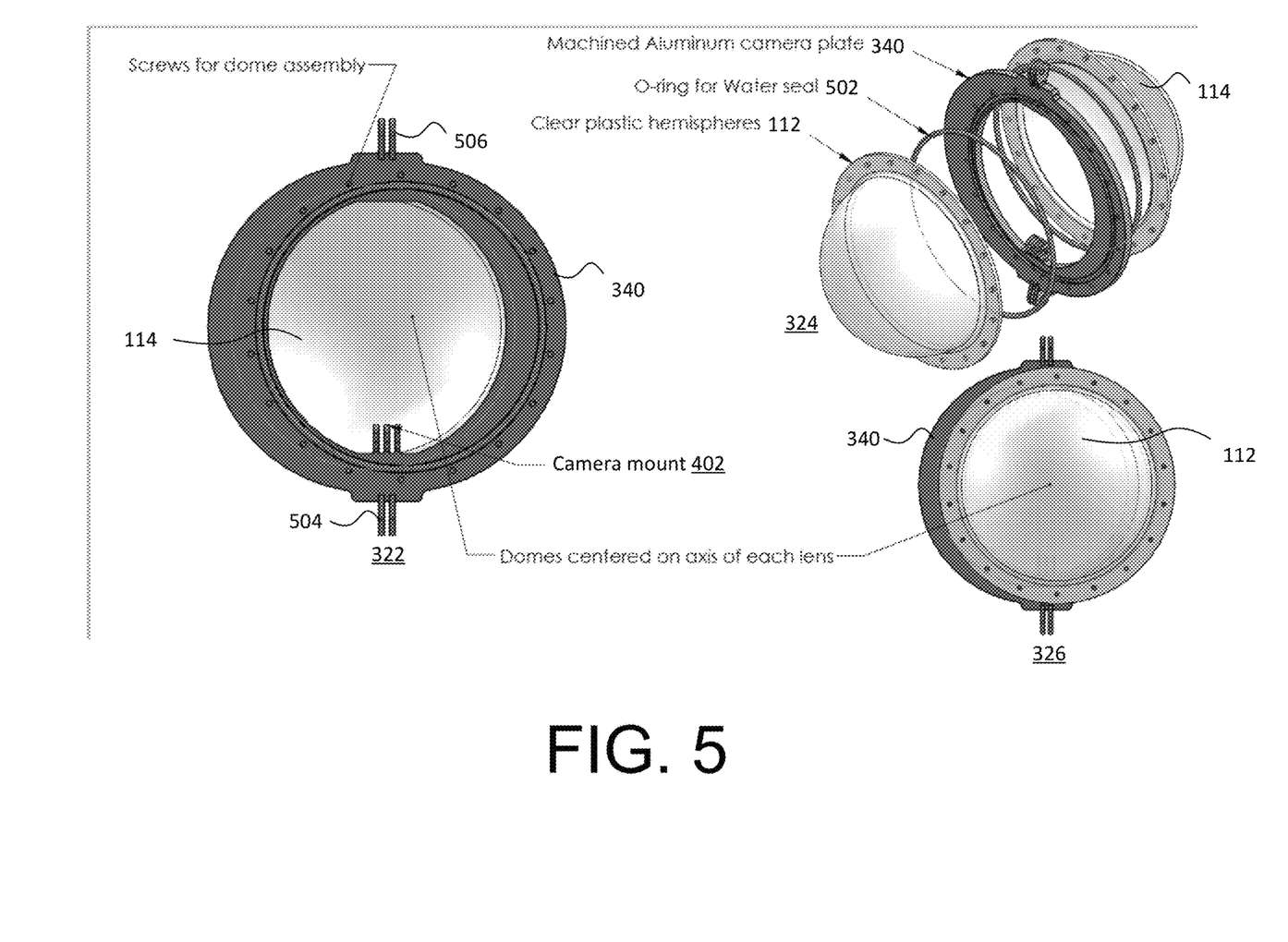
FIG. 5 is a perspective and exploded view of an embodiment of an underwater housing for a dual-lens camera.

FIG. 5 illustrates a front view, a cross-sectional view and an exploded perspective view of an example embodiment of an underwater housing 300 for housing a dual-lens spherical camera 100. As illustrated in the exploded view, a sealing element 502 such as a silicone rubber O-ring may be placed between the dome 132 and the mounting plate 340 and between the dome 134 and the mounting plate 340 to provide a watertight seal between the domes 132, 134 and the plate 340. The embodiment of FIG. 5 also illustrates a particular embodiment of a camera mount 402 for mounting the camera 100 to the plate 340. In this example, a three finger mount 402 on the housing 300 may be interlocked with a reciprocal two finger mount (not shown) on the camera 100 and the camera 100 may be secured to the housing via a screw (not shown) that passes through aligned holes on the two finger of the camera 100 three finger mount 402 of the housing 300. In an embodiment, additional two finger mounts 504, 506 may be located on an outer edge of the plate 340 and may provide attachment points for various external accessories.

Analysis of Dome Effects

Figure 6:
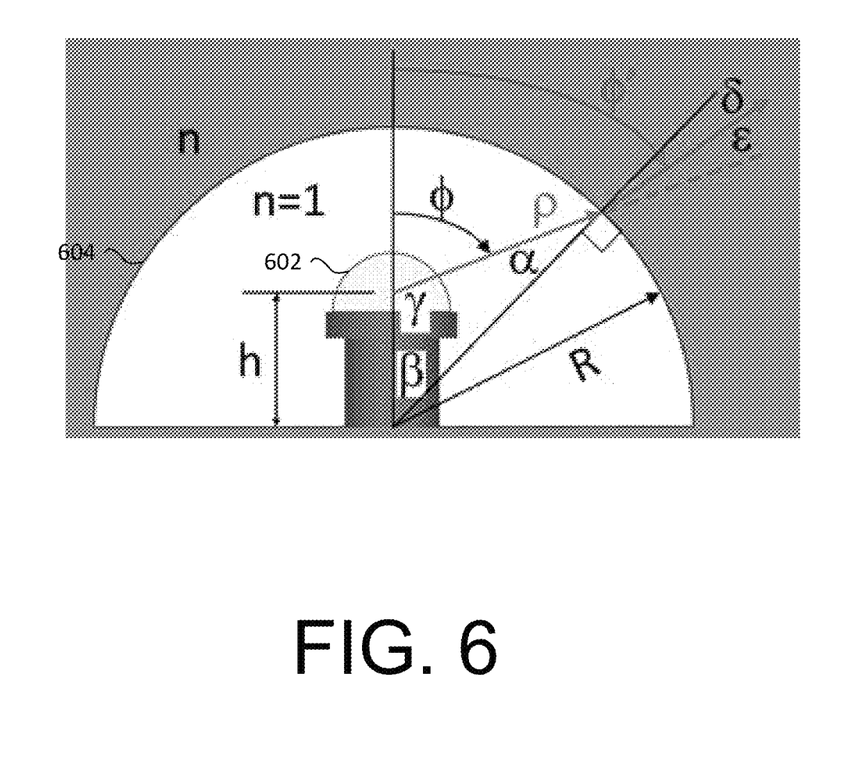
FIG. 6 is a diagram modeling the effect on field of view when an imaging lens is placed in a simple dome.

The domes 132, 134 may affect the respective fields of view of the corresponding lens assemblies 112, 114. As illustrated in FIG. 6, a main imaging lens 602 has a start point is an axial distance h within a dome 604 relative to the start point of the dome 604 which is aligned with the optical axis of the lens 602. The main imaging lens 602 has a focal length f and the dome has a radius R. The dome 604 is filled with air (n≈1). Outside of the dome 604, the refractive index is n (n≈1.33 underwater). ϕ is the imaging ray angle in air and ϕ' is the imaging ray angle outside of the dome 604. Finally, there are internal angles α, β, and γ and external angles δ and ε. Herein, the relationship between a and 6 is to be found using Snell's law.

The law of sines provides the following:

$$\frac{|R|}{\sin\gamma} = \frac{h}{\sin\alpha} = \frac{\rho}{\sin\beta} \quad (1)$$

As a result, $$\sin\alpha = \frac{h \cdot \sin\gamma}{|R|} = \frac{h \cdot \sin(180-\phi)}{|R|} = \frac{h \cdot \sin\phi}{|R|} \rightarrow \alpha = \sin^{-1}\left(\frac{h \cdot \sin\phi}{|R|}\right) \quad (2)$$

where R<0 in this geometry to obey optical definitions to follow. Then, using Snell's law, $$1 \cdot \sin\alpha = n \cdot \sin\delta \rightarrow \delta = \sin^{-1}\left(\frac{h \cdot \sin\phi}{|R| \cdot n}\right) \quad (3)$$

As well, it is easy to see that $$\varepsilon = \delta - \alpha \quad (4)$$

and $$\phi' = \phi + \varepsilon = \phi + \sin^{-1}\left(\frac{h \cdot \sin\phi}{|R| \cdot n}\right) - \sin^{-1}\left(\frac{h \cdot \sin\phi}{|R|}\right) \quad (5)$$

Therefore, Equations 5 and 4 can be used to calculate the new ray angle in water, ϕ', or the field of view change, ε, respectively, as a function of ϕ.

If the optical axis of the lens 602 is offset from the optical axis of the dome 604, then there will be polar angle dependent refractive effects similar in nature to but orthogonal to those of ε. Thus, different offsets will change the field of view differently. By using the offset dome configuration described above, these effects can be avoided and any field of view change will occur equally for each lens. This greatly simplifies the stitching algorithm.

The focus quality may also change when the camera and dome system is placed under water. There are two effects herein that will alter where the image plane lands relative to a sensor plane (e.g., the focus shift), 1) the curvature of the dome induces a negative optical power when inserted underwater thereby increasing the desired image distance (U) and 2) the change in optical path length of the portion of the object distance that is in the water will induce an optical reduction in the overall object distance (though there is no change in the physical object distance) thereby increasing desired mage distance. The geometry for this is diagrammed in FIG. 7.

Figure 7:
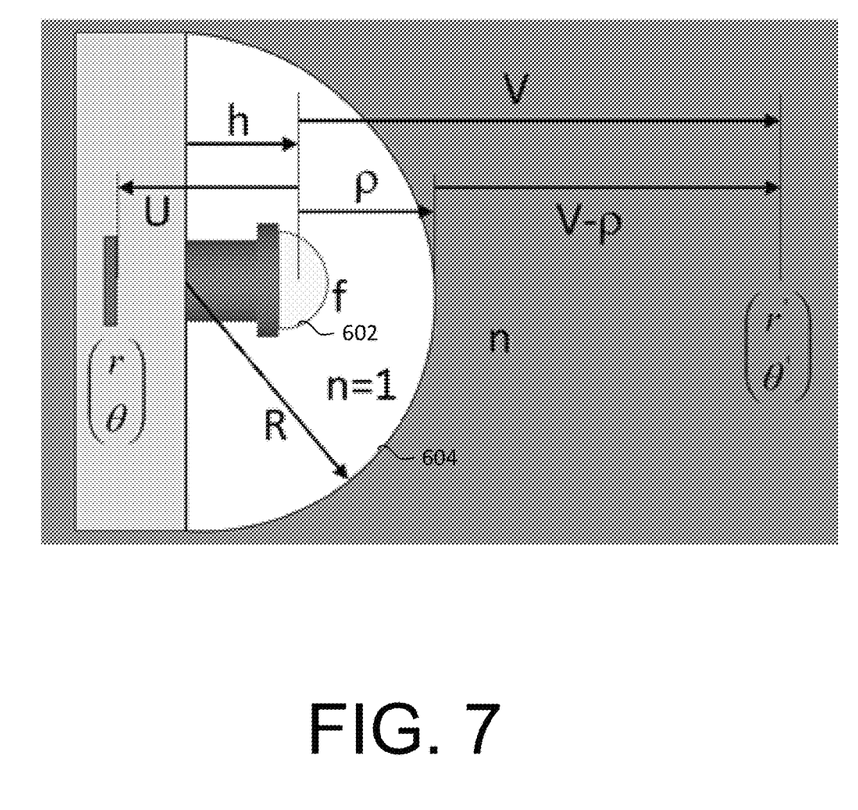
FIG. 7 is a diagram modeling the effect on focus when an imaging lens is placed in a simple dome.

In FIG. 7, the main parameters are the same as those described in FIG. 6. The additional parameters are the object distance, V (the physical distance as measured from the start point of the lens 602 to the object), the image distance, U, the input ray's height above the optical axis, r, the input ray's propagation angle relative to the optical axis, θ, the output ray's height above the optical axis, r' and the output ray's propagation angle relative to the optical axis, θ'. The imaging system in FIG. 7 may be analyzed under the paraxial approximation using the ABCD matrix mathematics. After analyzing the system, the difference in the image distance when the in-dome system is in air versus the image distance when it is in water may be calculated. This gives the defocus distance which is desirable for determining how system design choices impact image quality.

The ABCD matrix multiplication equation for the optical system shown in FIG. 7 is given below, noting that this formalism works whether examining the system forwards or backwards.

$$\begin{pmatrix} r' \\ \theta' \end{pmatrix} = \begin{pmatrix} 1 & [V-\rho] \\ 0 & 1 \end{pmatrix} \begin{pmatrix} 1 & 0 \\ \Gamma & \frac{1}{n} \end{pmatrix} \begin{pmatrix} 1 & \rho \\ 0 & 1 \end{pmatrix} \begin{pmatrix} 1 & 0 \\ \frac{-1}{f} & 1 \end{pmatrix} \begin{pmatrix} 1 & U \\ 0 & 1 \end{pmatrix} \begin{pmatrix} r \\ \theta \end{pmatrix} \quad (6)$$

Herein, $$\Gamma = \frac{1-n}{R \cdot n} \quad (7)$$

In this geometry R<0 but U, V, ρ, h and n are all positive. In the formalization of the ABCD law for analyzing optical systems, all of the 2×2 optical element matrices can be multiplied into a single 2×2 matrix for the system. When this is done, the general form of Equation 6 becomes $$\begin{pmatrix} r' \\ \theta' \end{pmatrix} = \begin{pmatrix} A & B \\ C & D \end{pmatrix} \begin{pmatrix} r \\ \theta \end{pmatrix} \quad (8)$$

Expansion of Equation 8 then reveals $$r' = r \cdot A + \theta \cdot B \quad (9a)$$

$$\theta' = r \cdot C + \theta \cdot D \quad (9b)$$

It may be determined by how much the image distance, U, shifts when the dome is in water relative to when it is in air. One technique is to track how U changes to keep the system in focus. If the input ray height is zero at the image plane (i.e., if the ray is on the optical axis at the image plane) then at focus the output ray height will also be zero at the object plane, and this will be true for all ray angles, θ. Examining Equation 9a, it can be seen that this condition is met if and only if the term B is equal to zero (at focus for r=0, r'=0 and θ=anything, so B=0 is required). Under this constraint it can be shown, $$U = \frac{\left( \rho + \frac{(V-\rho)}{n} + \rho \cdot (V-\rho) \cdot \left( \frac{1-n}{R \cdot n} \right) \right) \cdot f}{\rho + \frac{(V-\rho)}{n} + \rho \cdot (V-\rho) \cdot \left( \frac{1-n}{R \cdot n} \right) - \left( 1 + (V-\rho) \cdot \left( \frac{1-n}{R \cdot n} \right) \right) \cdot f} \quad (10)$$

Equation 10 can be used to apply two specific imaging conditions to obtain two specific values for U (i.e., one for when the dome is in liquid with n=n and the other for when the dome is in air with n=1). Then, simply calculating the difference between these two values for U will reveal the focus shift that occurs (i.e., from perfect focus in air to slightly out of focus in liquid). This is given as, $$\Delta U = \frac{\left( \rho + \frac{(V-\rho)}{n} + \rho \cdot (V-\rho) \cdot \left( \frac{1-n}{R \cdot n} \right) \right) \cdot f}{\rho + \frac{(V-\rho)}{n} + \rho \cdot (V-\rho) \cdot \left( \frac{1-n}{R \cdot n} \right) - \left( 1 + (V-\rho) \cdot \left( \frac{1-n}{R \cdot n} \right) \right) \cdot f} - \frac{V \cdot f}{V-f} \quad (11)$$

Using the equation above, the dome may be customized to manage tradeoffs under various scenarios. Furthermore, any loss of focus can be quantified and compensated for in post-processing.

In addition to loss of field of view and a shift in the focal plane, taking a dome of air under water will cause a displacement of water. This principle can be applied to calculate the weight to be added to the system to make it neutrally buoyant under water. The mass of displaced water is calculated as:

$$M = D \cdot V \quad (12)$$

where M is the mass of the displaced water, D is the density of water (1 gm/cc) and V is the volume of displaced water. The volume of displaced water is given through simple geometry as $$V = \frac{4}{3} \cdot \pi \cdot |R|^3 \quad (13)$$

Next the weight of the camera and dome itself, m, is subtracted from M to achieve the final value for how much more weight can be added to the system to make it neutrally buoyant under water, B. This is given as $$B = M - m = \frac{4 \cdot \pi \cdot |R|^3 \cdot D}{3} - m \quad (14)$$

As an example, if R=−75 mm and m=0.8 kg then B≈1 kg. If R grows to −100 mm, then B grows to 3.4 kg for the same camera mass. This substantial growth in B (approximately 3.4 kg of buoyancy weight at R=−100 mm versus approximately 1 kg of buoyancy weight at R=−75 mm) comes with a somewhat better focus (approximately 8 um of defocus at R=−100 mm versus approximately 11 um of defocus at R=−75 mm) and a slightly lower FOV degradation (approximately 2.15 degrees of FOV loss at R=−100 mm versus approximately 2.9 degrees FOV loss at R=−75 mm). As can be seen from the examples above, the tradeoffs between field of view loss, focus, and buoyancy may be managed depending on the desired application.

Figure 8:
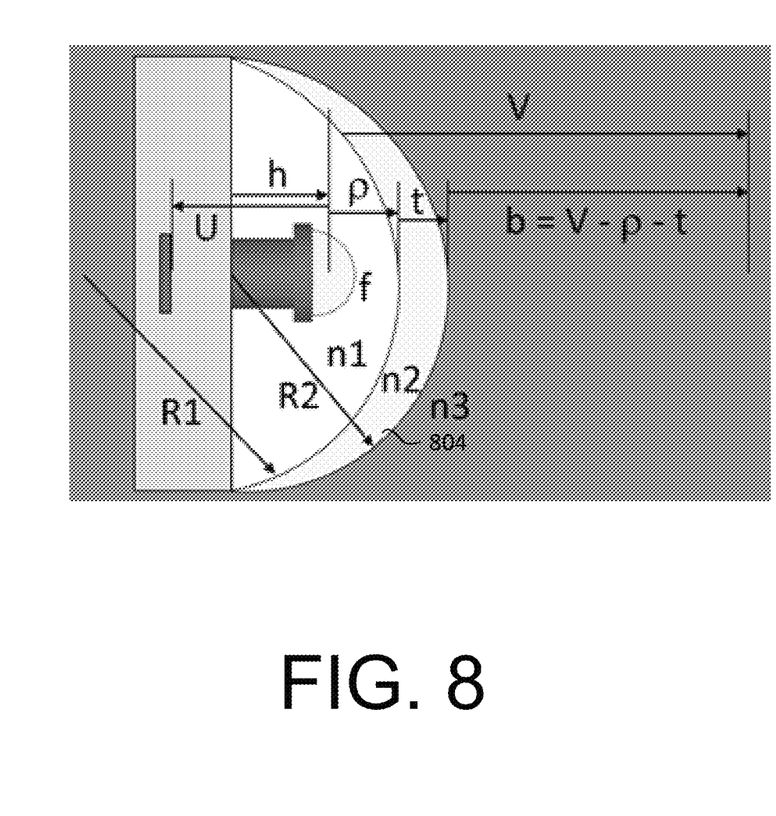
FIG. 8 is a diagram modeling the effect on focus when an imaging lens is placed in a dome modeled as a positive lens.

The effects of the simple dome cover model described above may be even better approximated by instead modeling the dome as a positive lens. In this manner, by varying the power of this lens focus may be traded off with the dome in the water and/or in air and the lens dome's effect on field of view. As well, by adding glass weight to the dome by allowing it to thicken into a positive lens, the underwater buoyancy can also be improved.

FIG. 8 diagrams the geometry to analyze the ABCD matrix mathematics for this system. In this system, the dome 802 is modeled as having an outer dome surface of radius, R1 and an inner dome surface of radius, R2. Using the parameters in FIG. 8, the ABCD system of equations becomes $$\begin{pmatrix} r' \\ \theta' \end{pmatrix} = \begin{pmatrix} 1 & b \\ 0 & 1 \end{pmatrix} \begin{pmatrix} \alpha & \beta \\ \chi & \delta \end{pmatrix} \begin{pmatrix} 1 & \rho \\ 0 & 1 \end{pmatrix} \begin{pmatrix} 1 & 0 \\ -\frac{1}{f} & 1 \end{pmatrix} \begin{pmatrix} 1 & U \\ 0 & 1 \end{pmatrix} \begin{pmatrix} r \\ \theta \end{pmatrix} \quad (15)$$

In Equation 15, the terms α, β, χ, δ come from the ABCD matrix for a thick lens, given as $$\begin{pmatrix} \alpha & \beta \\ \chi & \delta \end{pmatrix} = \begin{pmatrix} 1 & 0 \\ \frac{n_2 - n_3}{R_2 \cdot n_3} & \frac{n_2}{n_3} \end{pmatrix} \begin{pmatrix} 1 & t \\ 0 & 1 \end{pmatrix} \begin{pmatrix} 1 & 0 \\ \frac{n_1 - n_2}{R_1 \cdot n_2} & \frac{n_1}{n_2} \end{pmatrix} \quad (16)$$

Doing the math on Equation 16 then gives $$\alpha = 1 + t \cdot \left( \frac{n_1 - n_2}{R_1 \cdot n_2} \right) \quad (17a)$$

$$\beta = t \cdot \left( \frac{n_1}{n_2} \right) \quad (17b)$$

$$\chi = \left( \frac{n_2 - n_3}{R_2 \cdot n_3} \right) + t \cdot \left( \frac{n_1 - n_2}{R_1 \cdot n_2} \right) \cdot \left( \frac{n_2 - n_3}{R_2 \cdot n_3} \right) + \left( \frac{n_2}{n_3} \right) \cdot \left( \frac{n_1 - n_2}{R_1 \cdot n_2} \right) \quad (17c)$$

$$\delta = t \cdot \left( \frac{n_2 - n_3}{R_2 \cdot n_3} \right) \cdot \left( \frac{n_1}{n_2} \right) + \left( \frac{n_1}{n_3} \right) \quad (17d)$$

Solving Equation 15 for the focus condition (the B term is set to zero), the equation for U can be determined as $$U = \frac{(\rho \cdot \alpha + \beta + \rho \cdot \chi \cdot b + \delta \cdot b) \cdot f}{(\rho \cdot \alpha + \beta + \rho \cdot \chi \cdot b + \delta \cdot b) - (\alpha + \chi \cdot b) \cdot f} \quad (18)$$

In one example embodiment, it can be seen that when R2=−75 mm and R1=−175 mm, the net focus shift is zero microns, meaning that the system stays in focus when in the lens dome and underwater relative to when it is not in the dome and in air. Similarly, when R2=−100 mm and R1=−250 mm, the net focus shift is also zero microns. Under either of these two conditions, the system goes out of focus if it is pulled out of the water but left in the dome. For example, when R2=−75 mm and R1=−175 mm, the net focus shift is −22.5 microns in air. Also, when R2=−100 mm and R1=−250 mm, the net focus shift is −17 microns in air. In another embodiment, a compromise may be made such that there is a small net focus shift in both air and under water. For example, when R2=−75 mm and R1=−92 mm, the net focus shift is +9.2 um in water and −9.2 um in air, while when R2=−100 mm and R1=−125 mm, the net focus shift is +6.8 um in water and −6.8 um in air.

Example Camera Configuration

Figure 9:
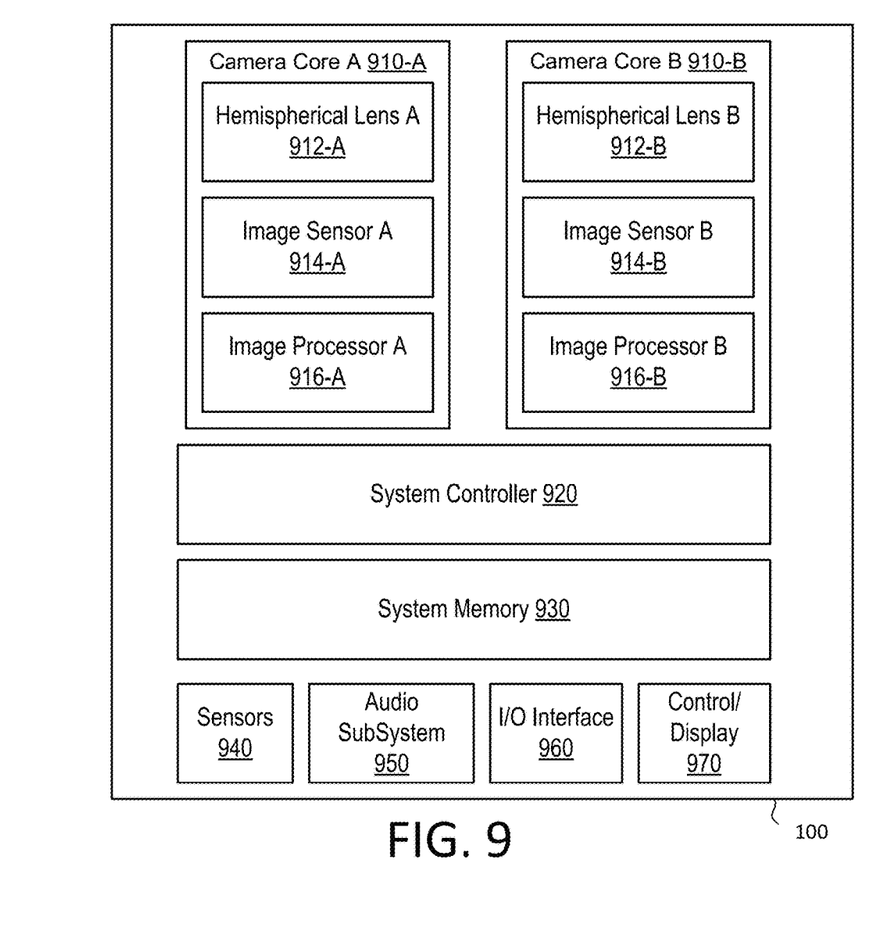
FIG. 9 is a block diagram illustrating an example embodiment of a dual-lens camera.

FIG. 9 is a block diagram illustrating a camera 100, according to one embodiment. In the illustrated embodiment, the camera 100 may comprise two camera cores 910 (e.g., camera core A 910-A and camera core B 910-B) each comprising a hemispherical lens 912 (e.g., hemispherical lens 912-A and hemispherical lens 912-B), an image sensor 914 (e.g., image sensor 914-A and image sensor 914-B), and an image processor 916 (e.g., image processor 916-A and image processor 916-B). The camera 100 may additionally include a system controller 920 (e.g., a microcontroller or microprocessor) that controls the operation and functionality of the camera 100 and system memory 930 that may be configured to store executable computer instructions that, when executed by the system controller 920 and/or the image processors 916, perform the camera functionalities described herein.

An input/output (I/O) interface 960 may transmit and receive data from various external devices. For example, the I/O interface 960 may facilitate the receiving or transmitting video or audio information through an I/O port. Examples of I/O ports or interfaces may include USB ports, HDMI ports, Ethernet ports, audioports, and the like. Furthermore, embodiments of the I/O interface 960 may include wireless ports that can accommodate wireless connections. Examples of wireless ports may include Bluetooth, Wireless USB, Near Field Communication (NFC), and the like. The I/O interface 960 may also include an interface to synchronize the camera 100 with other cameras or with other external devices.

A control/display subsystem 970 may include various control and display components associated with operation of the camera 100 including, for example, LED lights, a display, buttons, microphones, speakers, and the like. The audio subsystem 950 may include, for example, one or more microphones and one or more audio processors to capture and process audio data correlated with video capture.

Sensors 940 may capture various metadata concurrently with, or separately from, video capture. For example, the sensors 940 may capture time-stamped location information based on a global positioning system (GPS) sensor, and/or an altimeter. Other sensors 940 may be used to detect and capture orientation of the camera 100 including, for example, an orientation sensor, an accelerometer, a gyroscope, or a magnetometer.

In alternative embodiments, one or more components of the camera cores 910 may be shared between different camera cores 910. For example, in one embodiment, the camera cores 910 may share one or more image processors 916. Furthermore, in alternative embodiments, the camera cores 910 may have additional separate components such as, for example, dedicated system memory 930 or system controllers 920.

In one embodiment, the camera 100 may comprise a twin hyper-hemispherical lens system that capture two image hemispheres with synchronized image sensors which combine to form a contiguous spherical image. Each of the two streams generated by camera cores 910 may be separately encoded and then aggregated in post processing to form the spherical video. For example, each of the two streams may be encoded at 2880×2880 pixels at 30 frames per second and combined to generate a 5760×2880 spherical video at 30 frames per second. Other resolutions and frame rates may also be used.

In an embodiment the spherical content may be captured at a high enough resolution to guarantee the desired output from the relevant sub-frame will be of sufficient resolution. For example, if a horizontal field of view of 120° at an output resolution of 1920×1080 pixels is desired in the final output video, the original spherical capture may include a horizontal 360° resolution of at least 5760 pixels (3×1920).

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. An underwater camera system, comprising:
   a dual-lens camera comprising:
      a camera body comprising at least a first face and a second face opposite the first face;
      a first image sensor to capture first images corresponding to a first field of view;
      a second image sensor to capture second images corresponding to a second field of view;
      a first lens assembly to focus light entering the first lens assembly onto the first image sensor;
      a second lens assembly to focus light entering the second lens assembly onto the second image sensor,
      wherein the first lens assembly has a first optical axis laterally offset from a second optical axis of the second lens assembly;
   an underwater housing comprising:
      a mounting structure including a generally ring-shaped disc comprising opposing first and second generally planar surfaces, an outer perimeter portion defined by an annular outer wall, and an inner perimeter portion surrounding a cutout and defined by an annular inner wall, the annular outer wall and the annular inner wall extending between the first and second surfaces so as to directly connect the first and second surfaces, the first surface having a first plurality of attachment points, and the second surface having a second plurality of attachment points, the mounting structure further including a camera mount for securing the dual-lens camera within the cutout;
      a first dome coupled to the first surface of the mounting structure via the first plurality of attachment points; and
      a second dome coupled to the second surface of the mounting structure via the second plurality of attachment points, the mounting structure, the first dome, and the second dome collectively defining an enclosed, waterproof interior space configured to receive the dual-lens camera,
   wherein a first central axis of the first dome is laterally offset from a second central axis of the second dome.

2. The underwater camera system of claim 1, wherein
   the first dome comprises a first transparent substantially hemispherical portion and a first generally annular flange portion, the first flange portion extending radially from a first substantially circular edge of the first hemisphere portion, the first flange portion having a first surface that mates with the first surface of the mounting structure and is secured with the mounting structure via the first plurality of attachment points; and
   the second dome comprises a second transparent substantially hemispherical portion and a second generally annular flange portion, the second flange portion extending radially from a second substantially circular edge of the second hemisphere portion, the second flange portion having a second surface that mates with a corresponding surface of the second surface of the mounting structure and is secured with the mounting structure via the second plurality of attachment points.

3. The underwater camera system of claim 2, wherein the underwater housing further comprises:
   a first compressible sealing element between the first flange portion and the first surface of the mounting structure; and
   a second compressible sealing element between the second flange portion and the second surface of the mounting structure.

4. The underwater camera system of claim 1, wherein the first plurality of attachment points are laterally offset from the second plurality of attachment points on the second surface of the mounting structure.

5. The underwater camera system of claim 1, wherein the first central axis of the first dome is substantially aligned with the first optical axis of the first lens assembly, and wherein the second central axis of the second dome is substantially aligned with the second optical axis of the second lens assembly.

6. The underwater camera system of claim 1, wherein the first dome and the second dome each comprise a hemisphere.

7. The underwater camera system of claim 1, wherein the first dome and the second dome each comprise a raised hemisphere comprising a hemispherical portion and a cylindrical portion.

8. The underwater camera system of claim 1, wherein the first dome and the second dome each comprise a parabolic surface.

9. An underwater housing for a camera, comprising:
   a mounting structure including a generally ring-shaped disc comprising opposing first and second generally planar surfaces, an outer perimeter portion defined by an annular outer wall, and an inner perimeter portion surrounding a cutout and defined by an annular inner wall, the annular outer wall and the annular inner wall extending between the first and second surfaces so as to directly connect the first and second surfaces, the first surface having a first plurality of attachment point, and the second surface having a second plurality of attachment points, the mounting structure further including a camera mount for securing a camera within the cutout;
   a first dome coupled to the first surface of the mounting structure via the first plurality of attachment points; and
   a second dome coupled to the second surface of the mounting structure via the second plurality of attachment points, the mounting structure, the first dome, and the second dome collectively defining an enclosed, waterproof interior space configured to receive the camera,
   wherein a first central axis of the first dome is laterally offset from a second central axis of the second dome.

10. The underwater housing of claim 9, wherein
   the first dome comprises a first transparent substantially hemispherical portion and a first generally annular flange portion, the first flange portion extending radially from a first substantially circular edge of the first hemisphere portion, the first flange portion having a first surface that mates with the first surface of the mounting structure and is secured with the mounting structure via the first plurality of attachment points; and
   the second dome comprises a second transparent substantially hemispherical portion and a second generally annular flange portion, the second flange portion extending radially from a second substantially circular edge of the second hemisphere portion, the second flange portion having a second surface that mates with a corresponding surface of the second surface of the mounting structure and is secured with the mounting structure via the second plurality of attachment points.

11. The underwater housing of claim 10, further comprising:
   a first compressible sealing element between the first flange portion and the first surface of the mounting structure; and
   a second compressible sealing element between the second flange portion and the second surface of the mounting structure.

12. The underwater housing of claim 9, wherein the first plurality of attachment points are laterally offset from the second plurality of attachment points on the second surface of the mounting structure.

13. The underwater housing of claim 9, wherein the first dome and the second dome each comprise a hemisphere.

14. The underwater housing of claim 9, wherein the first dome and the second dome each comprise a raised hemisphere comprising a hemispherical portion and a cylindrical portion.

15. The underwater housing of claim 9, wherein the first dome and the second dome each comprise a parabolic surface.

16. An underwater housing for a camera, comprising:
   a mounting structure including a generally ring-shaped disc comprising opposing first and second generally planar surfaces, an outer perimeter portion defined by an annular outer wall, and an inner perimeter portion surrounding a cutout and defined by an annular inner wall, the annular outer wall and the annular inner wall extending between the first and second surfaces so as to directly connect the first and second surfaces, and the mounting structure further including a camera mount for securing a camera within the cutout;
   a first dome coupled to the first surface of the mounting structure; and
   a second dome coupled to the second surface of the mounting structure opposite the first surface, the mounting structure, the first dome, and the second dome collectively defining an enclosed, waterproof interior space configured to receive the camera,
   wherein a first central axis of the first dome is laterally offset from a second central axis of the second dome.

17. The underwater housing of claim 16, wherein
   the first dome comprises a first transparent substantially hemispherical portion and a first generally annular flange portion, the first flange portion extending radially from a first substantially circular edge of the first hemisphere portion, the first flange portion having a first surface that mates with the first surface of the mounting structure; and
   the second dome comprises a second transparent substantially hemispherical portion and a second generally annular flange portion, the second flange portion extending radially from a second substantially circular edge of the second hemisphere portion, the second flange portion having a second surface that mates with a corresponding surface of the second surface of the mounting structure.

18. The underwater housing of claim 17, further comprising:
   a first compressible sealing element between the first flange portion and the first surface of the mounting structure; and
   a second compressible sealing element between the second flange portion and the second surface of the mounting structure.

19. The underwater housing of claim 16, wherein the first dome and the second dome each comprise a hemisphere.

20. The underwater housing of claim 16, wherein the first dome and the second dome each comprise a raised hemisphere comprising a hemispherical portion and a cylindrical portion.

* * * * *